(No Model.)
C. M. LUNGREN.
INCANDESCENT GAS LIGHT.
No. 336,576.  Patented Feb. 23, 1886.
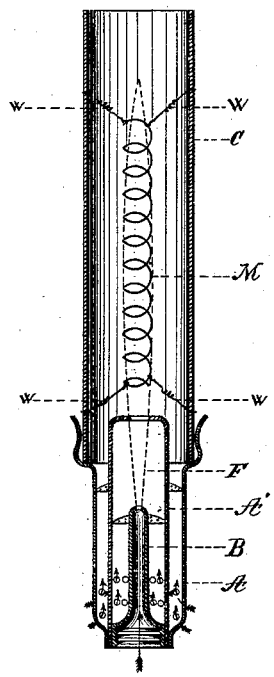
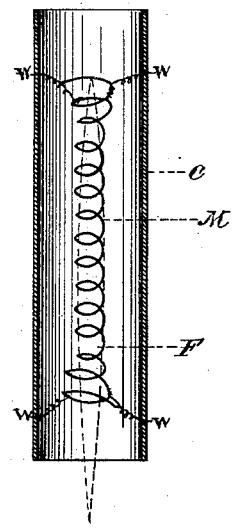
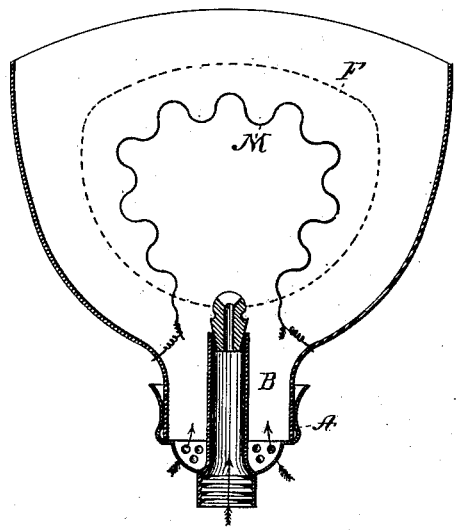
WITNESSES:
Gabriel J. W. Galster.
Wm. H. Capel.
INVENTOR
C. M. Lungren
BY
H. C. Townsend
ATTORNEY
N. PETERS. Photo-Lithographer. Washington, D. C.

UNITED STATES PATENT OFFICE.

CHARLES M. LUNGREN, OF NEW YORK, N. Y.

INCANDESCENT GAS-LIGHT.

SPECIFICATION forming part of Letters Patent No. 336,576, dated February 23, 1886.

Application filed August 12, 1885. Serial No. 174,233. (No model.)

*To all whom it may concern:*

Be it known that I, CHARLES M. LUNGREN, a citizen of the United States, and a resident of New York, in the county of New York and State of New York, have invented certain new and useful Improvements in Incandescent Gas-Lights, of which the following is a specification.

This invention has reference to the manner of supporting a wire or filament in a gas-flame so as to be rendered incandescent by the heat of the flame. In order to obtain economical results, such a wire or filament must be very thin, and must be protected from the loss of heat by conduction through the supports. As the wires or filaments of the requisite fineness are exceedingly delicate, it is essential to support them in such a manner that they will not be readily injured in the ordinary use of the burner, and so that they can be easily renewed in case of their breakage. In the present invention I make use of a method of supporting them in the flame which accomplishes the above ends. This consists in surrounding the flame by an inclosing-glass and supporting or attaching the filament upon or to the glass inclosure by means of thin supports consisting of fine wires or other suitable device. The filament and glass are removable together, so that the filament is wholly protected from coming in contact with any obstacle which would damage it. If it becomes broken and unfit for use from any cause, a new glass and its contained filament is substituted. By making the supports fine enough the loss of the heat by conduction through the supports is reduced to a minimum.

The incandescing filament may be formed of a refractory metal, such as platinum or of platinum and iridium; but I prefer to construct it of the refractory earths, as described in my application for patent filed August 12, 1885, No. 174,233½.

The filament may be attached to the surrounding glass by means of metal wires, or by filaments of glass, or of refractory earthy material, such as those used in making the filament. When metal wires are used as supports, they may be attached to the glass in a number of ways; but I prefer sealing them into the glass.

When the incandescent filament is of refractory earths, its ends may be sealed directly into the glass. It may, however, be attached to metal wires, and this is much the more preferable method of mounting, as it allows for expansion and contraction of the filament and is more easily manufactured.

Any form of flame, a simple jet, an Argand, or flat flame, may be used, and the filaments may take a variety of shapes.

In the drawings I show two forms of filament, a spiral and a bow, which will be sufficient to clearly illustrate the invention.

Figure 1 shows a vertical section of burner, in which the filament is in the form of a spiral. Figs. 2 and 3 are details of construction, and Fig. 4 a form of burner employing a flat flame.

In Fig. 1, B is the gas-tube, provided with an opening in the top from which issues a simple round gas-jet.

A' is a surrounding air-shell of any desired material, which is continued up above the gas-pipe B, so as to become heated by the lower portion of the flame.

A is a second air-shell surrounding A', and provided with any suitable support for the glass chimney C.

M is an incandescing spiral arranged concentric with the axis of the chimney, and of such diameter that it will lie in the outer shell of the flame F. The spiral filament is supported within the chimney or glass inclosure by wires W, which are shown sealed into the glass. These wires are preferably of platinum, and are twisted into spirals for part of their length to allow for the expansion and contraction of the filament. They may be attached to the filament when the latter is a platinum wire by simply twisting the two together, or by brazing.

When the filaments are constructed of refractory earths, they may be attached by forming in the supporting-wire a small spiral through which the end of the filament is slipped, as shown in Fig. 2, and then secured in place by means of a plastic mass of silica and clay or other earths, the joint being heated in a flame until the plastic material is burned hard. In order that these joints may not be in the flame, which renders the filament incandescent, the spiral is preferably made with large ends, as shown in Fig. 3. By enlarging these ends to the size of the glass chimney the filament may be sealed directly to the glass without the interposition of wires. In Fig. 4 C is a flattened shade of a proper shape to inclose the flame F. M is the filament in the form of a bow, and bent in and out so as to expose a greater length to the flame. Its ends are brought down outside of the flame and sealed in the glass, or secured to wires in the manner above described, which wires are sealed in the glass, as in the above-described form. The glass is supported on the top of the air-shell A, as shown.

It will be readily seen that this construction thoroughly protects the filament from injury and from loss of heat through the supports.

What I claim as my invention is—

1. In an incandescent gas-light apparatus, the combination of a gas-burner, a chimney or globe of glass or other transparent material, and an incandescent filament contained within the chimney and attached to it by wires or other suitable supports, substantially as specified.

2. In an incandescent gas-light apparatus, the combination of a gas-burner, a glass chimney or globe, and an incandescing filament contained within the chimney and attached to it by suitable supports sealed into the glass, substantially as specified.

3. In an incandescent gas-light apparatus, the combination of a gas-burner, a chimney or globe of glass or other transparent material, and an incandescing filament of refractory earth contained within the chimney, and attached to it by wires or other suitable supports, substantially as specified.

Signed at Philadelphia, in the county of Philadelphia and State of Pennsylvania, this 7th day of August, A. D. 1885.

CHARLES M. LUNGREN.

Witnesses:
ALBERT W. COX,
CHARLES CARON.